Dec. 24, 1946.  J. A. LOGAN  2,413,057
LIQUID MEASURING AND DISPENSING APPARATUS
Filed July 21, 1944  5 Sheets-Sheet 1
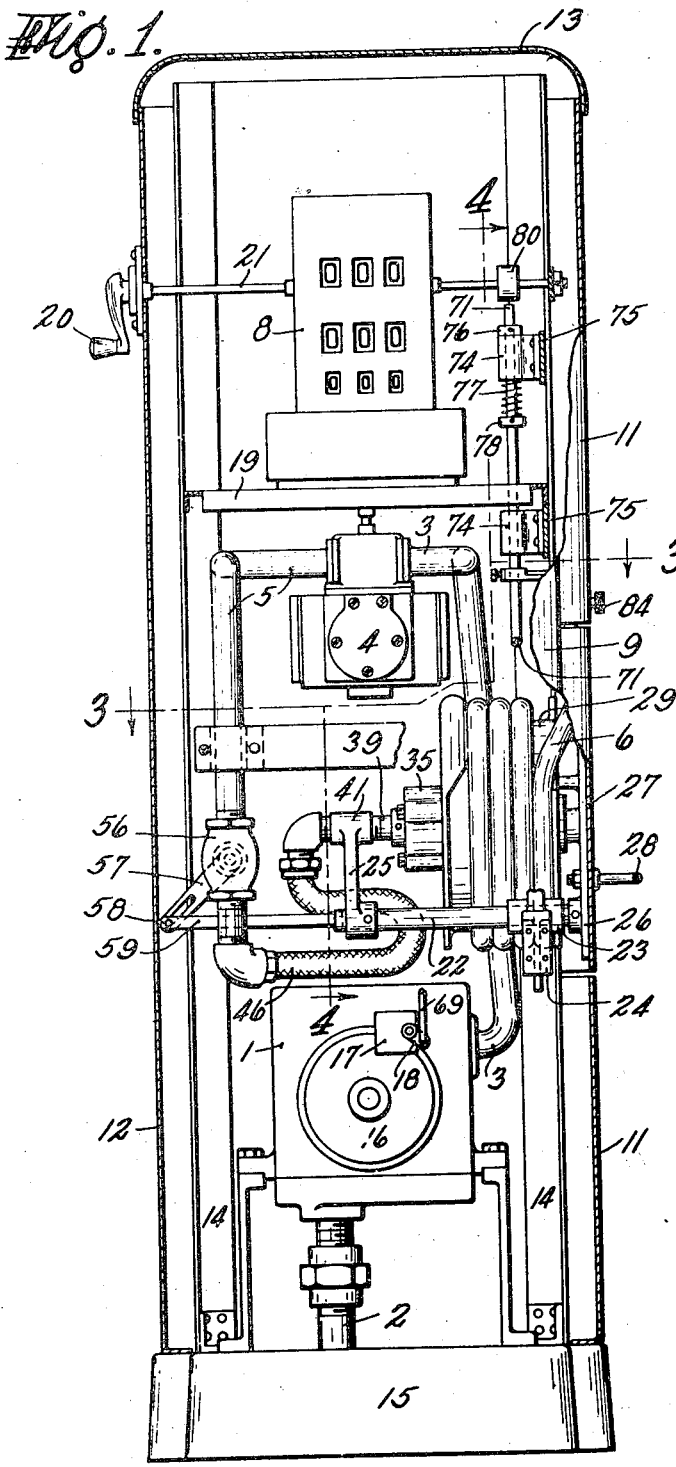
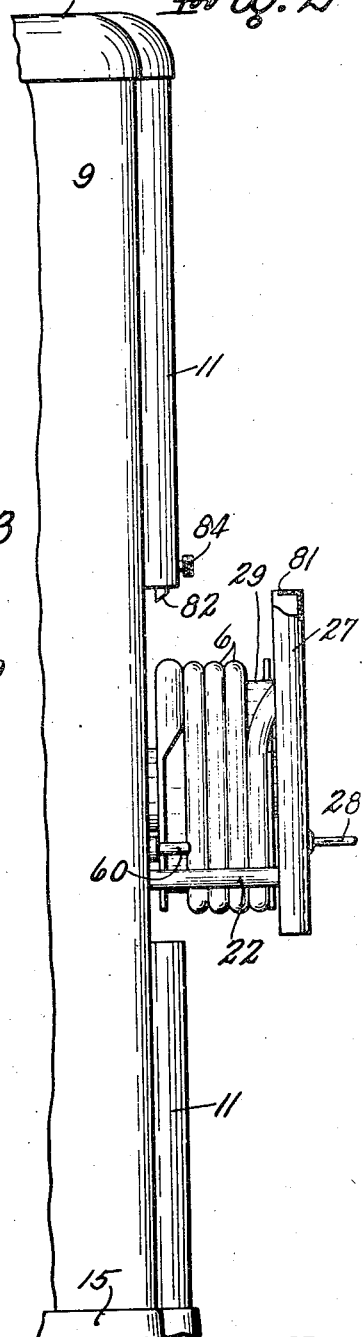
INVENTOR
JOSEPH A. LOGAN
BY Chapin & Neal
ATTORNEYS

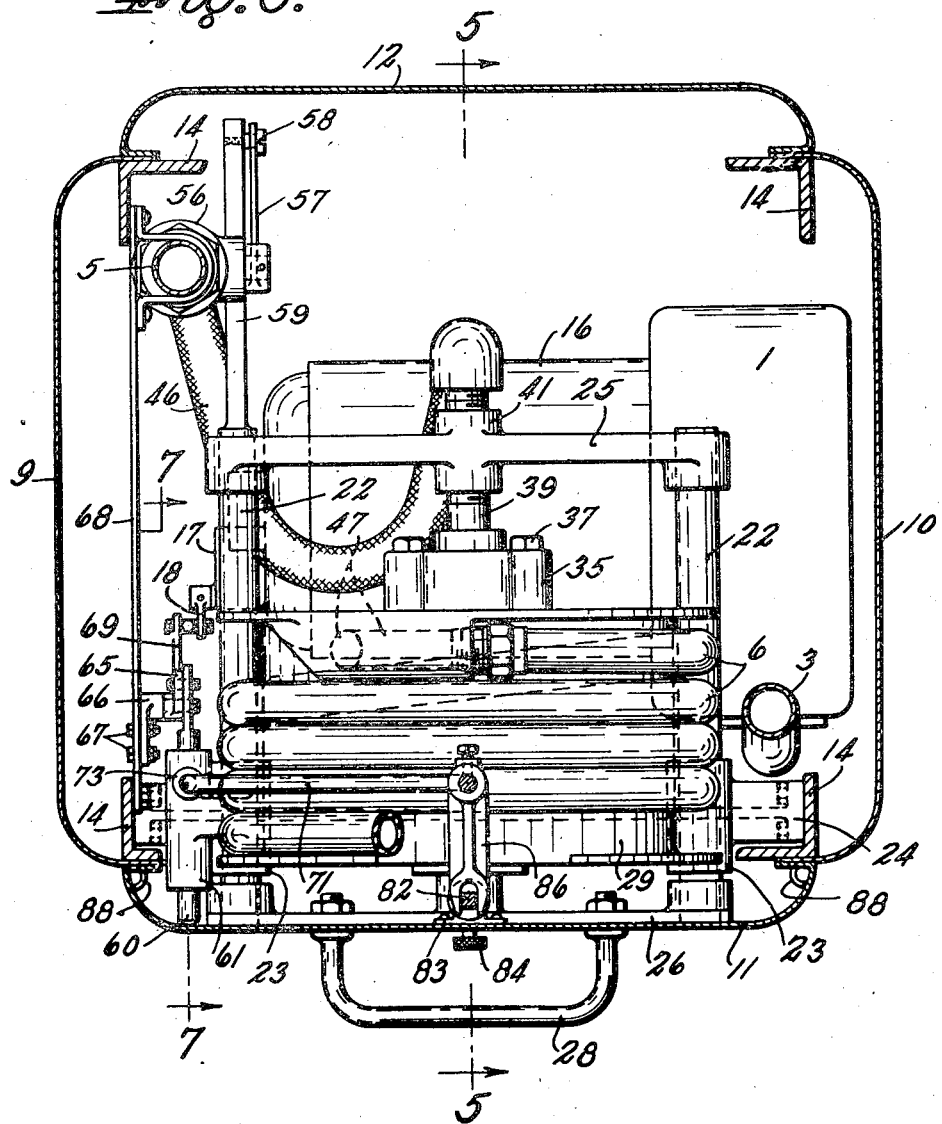

Dec. 24, 1946.   J. A. LOGAN   2,413,057
LIQUID MEASURING AND DISPENSING APPARATUS
Filed July 21, 1944   5 Sheets-Sheet 3

INVENTOR
JOSEPH A. LOGAN
BY Chapin & Neal
ATTORNEYS

Dec. 24, 1946.  J. A. LOGAN  2,413,057
LIQUID MEASURING AND DISPENSING APPARATUS
Filed July 21, 1944  5 Sheets-Sheet 4
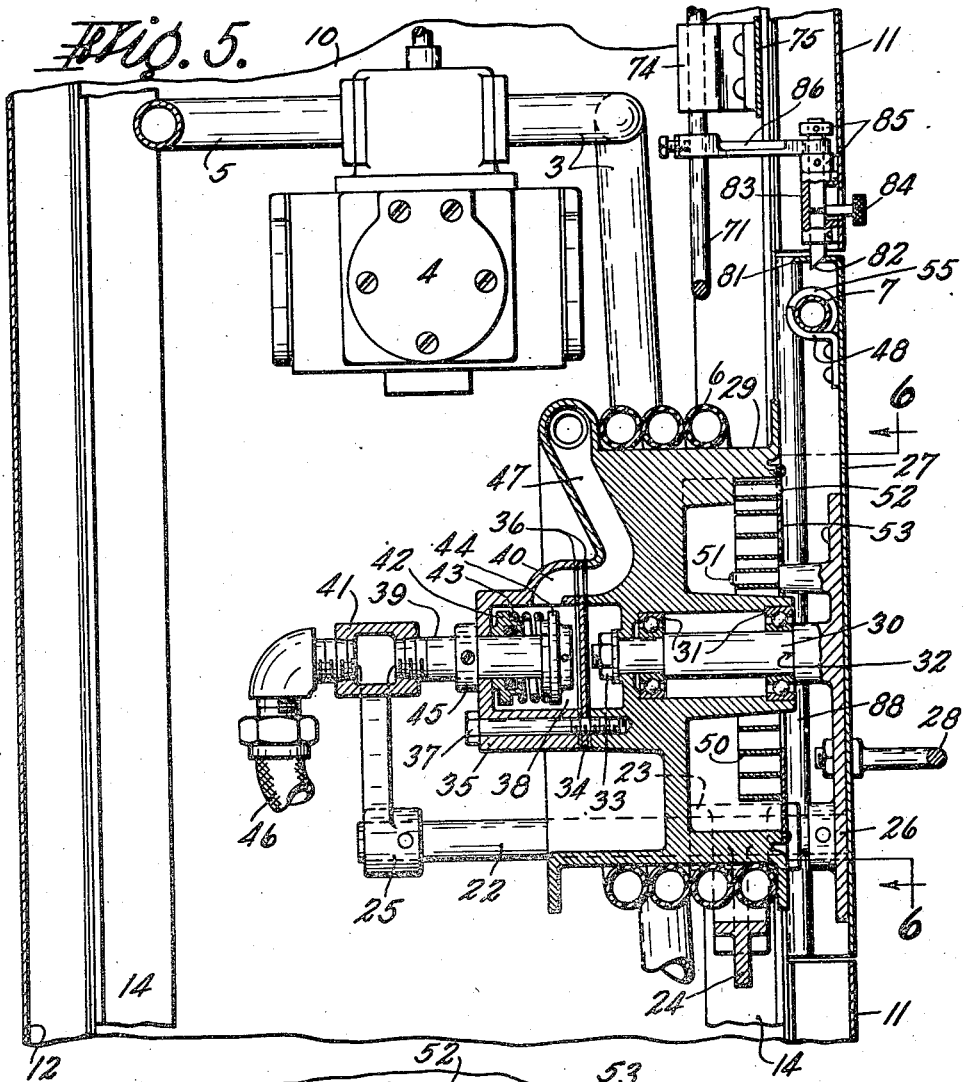
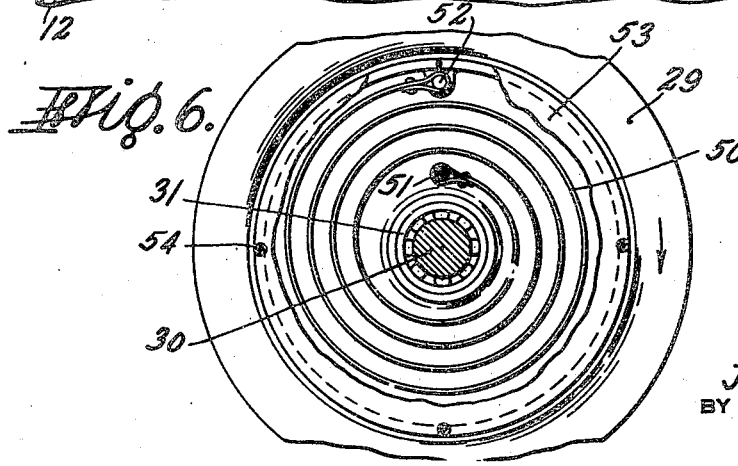
INVENTOR
JOSEPH A. LOGAN
BY Chapin & Neal
ATTORNEYS

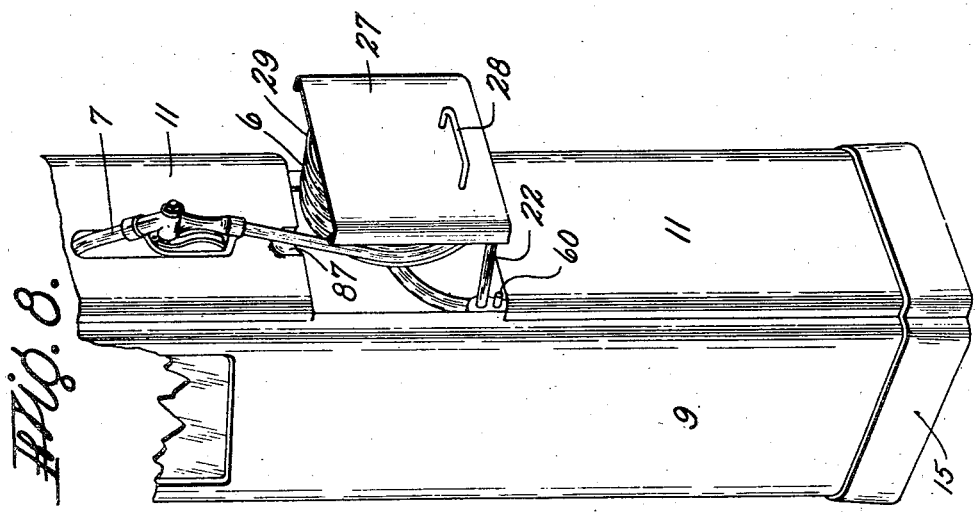
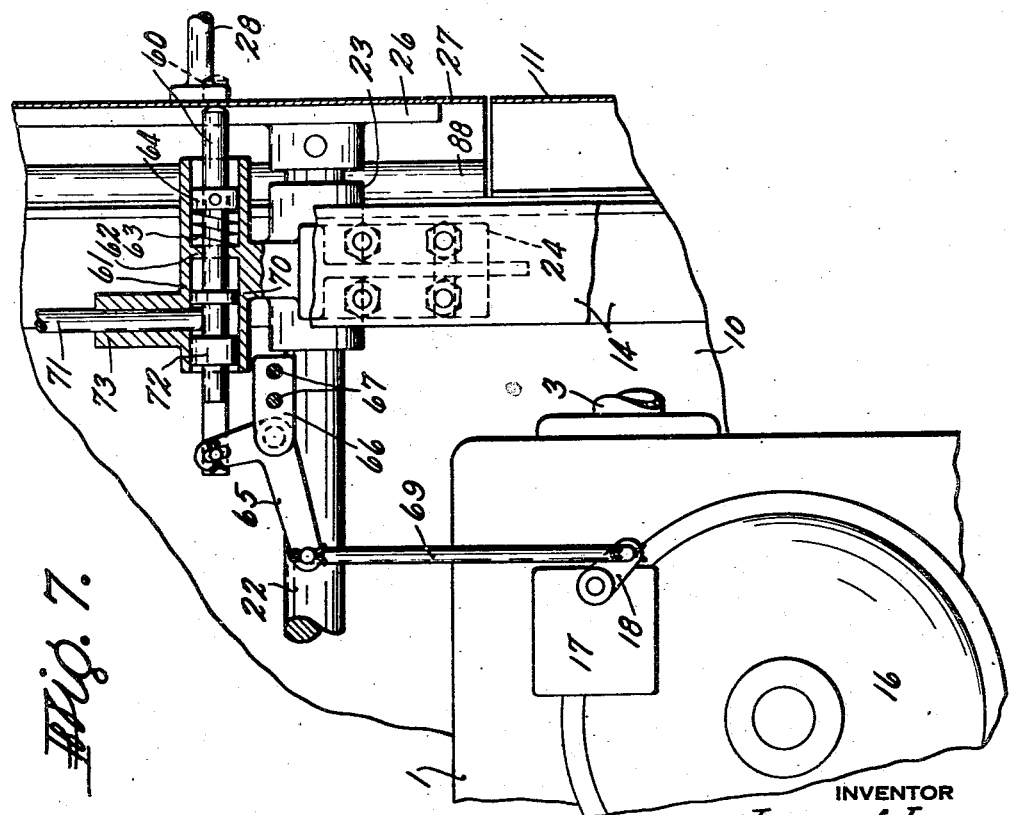

Patented Dec. 24, 1946

2,413,057

UNITED STATES PATENT OFFICE 2,413,057

LIQUID MEASURING AND DISPENSING APPARATUS

Joseph A. Logan, Hadley, Mass., assignor to Gilbert & Barker Manufacturing Company, West Springfield, Mass., a corporation of Massachusetts Application July 21, 1944, Serial No. 545,893

6 Claims. (Cl. 222—74)

This invention relates to improvements in liquid measuring and dispensing apparatus, such for example as is used for dispensing measured quantities of gasoline or the like in service stations.

The invention has for its object to provide in an apparatus of the class described, a reel on which the dispensing hose is wound and which is bodily movable from a completely housed position inside the casing to a position outside the casing, where the hose may be unwound from the reel for servicing a car and subsequently rewound, when the servicing is completed.

The invention has for another object to provide in the apparatus of the class described, a door in the casing of the apparatus, and a carriage, which carries a reel, or other form of hose storage means, and is mounted to slide horizontally into and out of the casing when the door is opened.

Another object of the invention is to provide in apparatus of the class described, means for starting and stopping the pump, or other liquid-forcing means, by the movement of the carriage respectively out of and into the casing or by the opening and closing of the aforesaid door.

Another object of the invention is to provide in apparatus of the class described, a valve in the dispensing conduit and means for opening and closing the valve by the opening and closing of the door or by the movement of the carriage out of and into the casing, respectively.

A further object of the invention is to provide in an apparatus of the class described, means for preventing resetting of the register when the hose reel, or other hose storage means is in servicing position outside the casing.

The invention will be disclosed with reference to the accompanying drawings, in which—

Fig. 1 is a front elevational view, with parts in section and parts broken away, of a liquid dispensing apparatus embodying the invention;

Fig. 2 is a fragmentary front elevational view of the apparatus showing the hose reel drawn out in position for use;

Fig. 3 is a sectional plan view taken on the line 3—3 of Fig. 1;

Fig. 5 is a cross sectional view taken on the line 5—5 of Fig. 3;

Fig. 6 is a sectional view taken on the line 6—6 of Fig. 5;

Fig. 7 is a fragmentary cross sectional view taken on the line 7—7 of Fig. 3; and Fig. 8 is a fragmentary perspective view of a liquid dispensing apparatus showing a modification of the invention.

Figure 4:
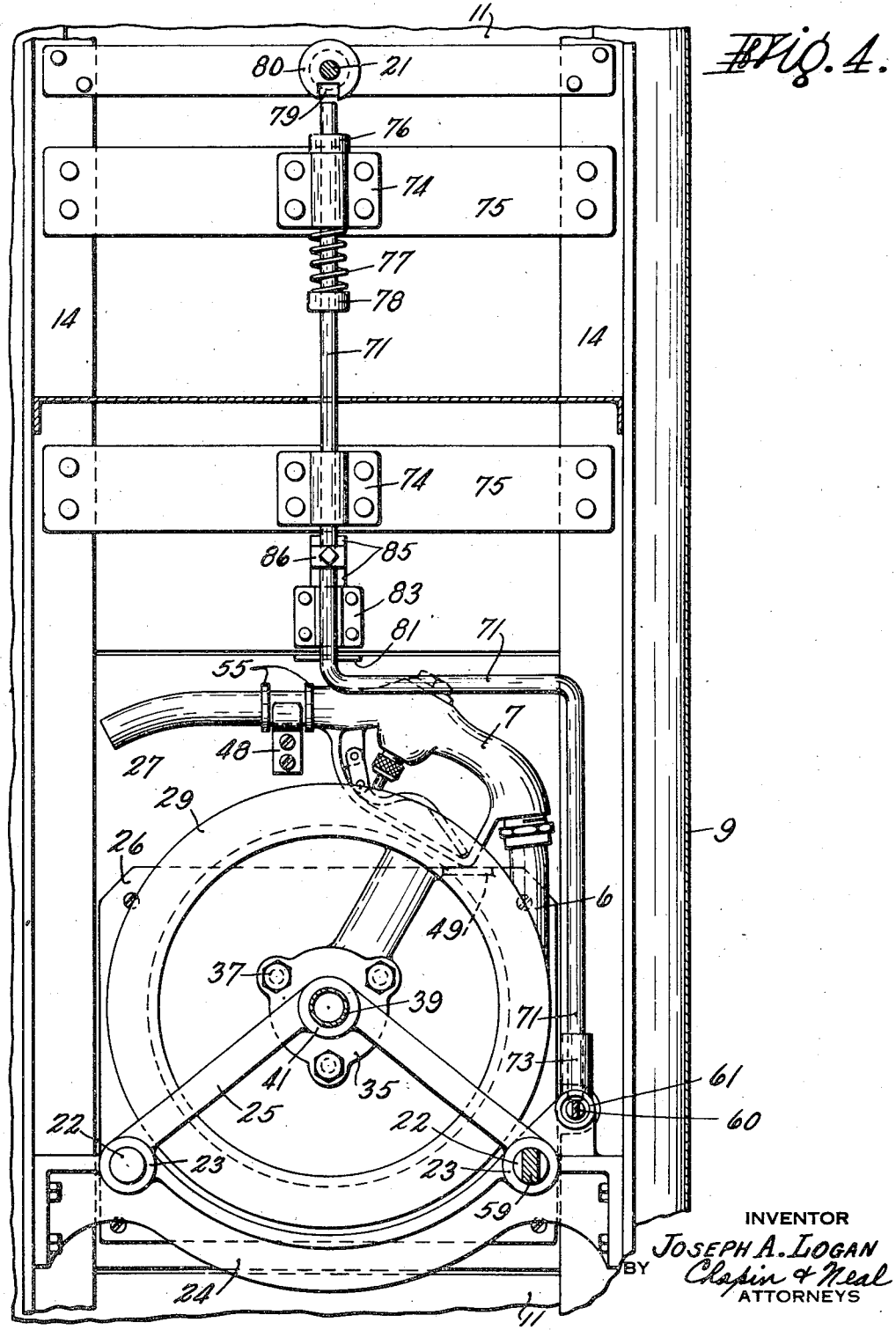
Fig. 4 is a fragmentary cross sectional view taken on the line 4—4 of Fig. 1.

Referring to these drawings and first to Fig. 1 thereof, the invention is shown, by way of illustrative example, as embodied in a gasoline dispensing apparatus of a form that is well known and now currently used. Such apparatus includes a combined pump and air separator unit 1, a suction pipe 2 for the pump, a discharge pipe 3 for air-free liquid leading from the separator to a meter 4, a discharge conduit for the meter including rigid piping 5 and, as its terminal portion, a flexible hose 6 having on its delivery end the usual valve-controlled nozzle 7 (shown in Fig. 4). The apparatus also includes suitable registering means 8, driven by the meter 4 and indicating the quantity and/or cost of the measured quantities of liquid dispensed. This apparatus is housed in a suitable casing, including sheet metal front and back walls 9 and 10, respectively, side walls 11 and 12 and a top 13, together with a framework of four angle irons 14, fixed to and upstanding from a base 15. The pump-separator unit 1 is supported by legs 16 from base 15. The pump is driven by an electric motor 16 supported from a side wall of unit 1. The motor is provided with a switch which is contained within a box 17 and which is operable by a lever 18, being closed and opened, as the lever is raised and lowered, respectively. The register 8 is supported from a platform 19, fixed to the angle irons 14. The register is provided with suitable means for resetting it to zero. As herein shown, such means includes a hand crank 20 fixed to a shaft 21, suitably mounted, as indicated, in the casing and framework of the apparatus.

The present invention provides a hose storage means, such as a reel, on which hose 6 is wound and which is mounted on a carriage that can be moved out of and into the pump casing to carry the reel into and out of operative position, as shown in Figs. 2 and 1 respectively. Also, the carriage is interlocked with the register-resetting means, such as shaft 21, so as to render the latter inoperable while the carriage is drawn out. The carriage is also interlocked with the switch of the pump motor so as to start and stop the latter, when the carriage is moved into and out of operative position, respectively.

The carriage includes a pair of parallel rods 22, (Figs. 3 and 4) mounted to slide in bearings 23, provided one near each end of a supporting member 24, which spans the space between a pair of the angle irons 14 and is secured at its ends, one to each angle iron as indicated. The rods 22 are fixed at their inner ends to and interconnected by a cross member 25. The outer ends of rods 24 are fixed to a plate 26, to which is secured a sheet metal door 27 of the same cross sectional shape as the casing wall 11. This wall is provided in upper and lower sections, spaced apart to receive between them the door 27. When the carriage is in its inner position, door 27 is closed. When the door is opened, the carriage is drawn out, as indicated in Fig. 2. A handle 28 is fixed to the outer wall of the door as a convenient means for moving it. The outward movement of the carriage is limited by the abutment of the ends of cross member 24, with the inner ends of the bearings 23.

The described carriage carries a suitable hose storage means, in this case a reel 29. The plate 26 (Fig. 5) has fixed thereto an inwardly extending spindle 30 which by means of a pair of ball bearings 31, rotatably supports the reel. The reel is held in place axially on the spindle between a shoulder 32 on the latter and a nut 33 on the threaded inner end of the spindle. The nut is located in a recess in the inner end face of the hub of the reel and this recess is closed by a plate 34, which together with a casting 35 and suitable gaskets 36, is clamped to the hub by bolts 37.

The casting 35 affords within it a chamber 38 into which liquid may enter from a pipe 39 and from which liquid may leave by way of a passage 40. The pipe 39 is fixed at one end in the hollow central hub 41 of the above described cross member 25. The pipe 39 extends axially through the end wall of member 35 and into chamber 38 with its inner end in free communication at all times with such chamber. The casing 35, revolving with the reel, turns on pipe 39 and a seal ring 42, mounted on and sealed to the pipe, is pressed by a spring 43, acting against a collar 44 on the pipe, against the inner face of the end wall of member 35 to avoid leakage from the chamber 38. A collar 45 on the pipe 39 engages the outer end wall of member 35 and holds the latter and the seal ring parts in their proper relative positions during assembly of member 35 on reel 29.

The discharge conduit 5 of the meter 4 is connected, as indicated in Figs. 1 and 3, to the hollow hub 41 and thus to pipe 39. Such connection includes a flexible hose 46 of sufficient length to enable the desired range of sliding movement of the carriage. The hose reel has a cored passage 47 (Fig. 5) which at its inner end is in communication, by means of registering holes in plate 34 and gaskets 36, with the outlet 40 of chamber 38. This passage 47 extends radially outward and then turns and follows the periphery of the reel. The hose 6 at its inner end is connected, as indicated in Fig. 3, to such cored passage. The hose 6, as shown, is wound in several convolutions on reel 29 and its nozzle 7 is supported by a clip 48 (Figs. 4 and 5), fixed to the inner face of door 27 and by a lug 49 (Fig. 4) fixed on the plate 26 of the carriage.

The hose reel 29 (Fig. 5), in its face adjacent door 27, is provided with a recess to receive a spiral spring 50, which at one end (see also Fig. 6) is fastened to a pin 51 on plate 26 and at the other end is fastened to a pin 52 on the reel. A plate 53, fixed to the reel, as by screws 54, closes the spring recess in part and retains the spring in place. When the hose is pulled to unwind it from the reel, the reel turns clockwise, as viewed in Fig. 6, and thus winds up the spring 50. Subsequently, when the pull on the hose is relaxed, the spring 50 will turn the reel counterclockwise and wind up the hose. The winding up movement of the reel is limited in any suitable way, as by one of the flanges 55 (Fig. 4) on the nozzle 7 which will engage the nozzle-supporting clip 48. Figs. 4 and 6 are taken in opposite directions. Accordingly, the winding up movement of the reel is clockwise in Fig. 4 instead of counterclockwise as in Fig. 6.

Interposed in the discharge conduit 5 of the apparatus is a valve 56 (Figs. 1 and 3) having an actuating lever 57 with a slot which receives a stud 58, fixed in the inner end of an extension 59 of one of the rods 22 of the carriage. When the carriage is positioned as in Fig. 1, the valve 56 is closed, and when door 27 is opened to draw out the hose reel into the position shown in Fig. 2, the valve is open. The flow through the discharge conduit may thus be controlled by the movement of door 27 and the hose reel and its carriage.

Movement of door 27 is also arranged to control the switch of the pump motor, closing and opening the switch as the door is respectively opened and closed. Referring to Figs. 3 and 7, a rod 60 is mounted to slide horizontally in a sleeve 61 formed on member 24. The bore of this sleeve (Fig. 7) is divided by a partition 62 in which the rod slides. A spring 63, acting between the partition 62 and a collar 64 fixed to rod 60, tends to move the rod outwardly. The door 27 in closing abuts the outer end of rod 60 and moves it inwardly, compressing spring 63. The inner end of rod 60 is pivotally connected to one arm of a bellcrank lever 65, which is pivotally mounted in a bracket 66, fixed by bolts 67 (Fig. 3) to a cross bar 68, which spans the space between, and is secured at its ends to, a pair of the described angle irons 14. The other arm of bellcrank 65 is connected by a link 69 (Fig. 7) to switch lever 18. With the parts positioned as shown in Figs. 3 and 7, the switch is open. When door 27 is opened sufficiently, the spring 63 will move rod 60 outwardly into the position shown by dotted lines in Fig. 7 until a collar 70 on the rod abuts the partition 62. This movement of the rod will serve to close the switch and start the pump motor.

From Fig. 7, it will be clear that the described movement of rod 60 cannot occur while a vertical rod 71 has its lower end positioned as shown in the path of a cylindrical part 72 of rod 60. This rod 71, the lower end of which is slidably mounted in an upturned sleeve 73 on member 61, extends upwardly (Fig. 4) along the adjacent angle iron 14 to a point above the reel 29, where it turns inwardly to a point centrally of door 27 and then extends upwardly in a line radially of the register reset shaft 21. The rod 71 is suitably supported, as by a pair of bearings 74 fixed to cross bars 75 which interconnect a pair of angle irons 14 and are secured at their ends thereto. A collar 76, fixed to rod 71 near its upper end, is adapted by abutment with the upper face of the upper bearing 74 to limit the downward movement of rod 71. A spring 77 on rod 72, acting between the lower face of the upper bearing 74 and a collar 78 fixed on the rod, tends to hold rod 71 in the position shown in Figs. 4 and 7. When rod 71 is lifted, its upper end is adapted to engage in a notch 79 in a disk 80 fixed to reset shaft 21.

Rod 71 is lifted manually as an incident to unlocking door 27. As shown in Fig. 5, door 27 has a lug 81 inturned from its upper edge, forming a striker plate which is perforated to receive the beveled lower end of a latch bolt 82. This bolt is of square cross section and is slidably mounted in a hole of similar cross section in a casing 83, fixed to upper section of wall 11. A finger piece 84, fixed to the bolt, extends outside this section of wall 11 for convenient actuation. Fixed on the upper end of bolt 82 are two spaced collars 85, the lower one of which by abutment with the top of casing 83, limits the downward movement of the latch bolt and holds its beveled lower end at such a level that it can be cammed upwardly by striker plate 81 on a closing movement of door 27.

An arm 86, fixed at its inner end to rod 71, has its outer end forked (Fig. 3) to straddle the bolt 82 and to lie between the collars 85 (Fig. 5). It will thus be seen that when latch 82 is lifted by finger piece 84 to unlock door 27, the upper end of rod 71 will be pushed upwardly into notch 79 (Fig. 4) and the lower end of the rod will be lifted out of the path of the part 72 (Fig. 7). Door 27 may then be pulled outwardly and, in so doing, rod 60 moves out to close the switch and the part 72 (Fig. 7) moves in under the lower end of rod 71, thus holding rod 71 in notch 79 and preventing resetting of the register, while the door 27 is opened. In the act of closing door 27, the rod 60 will be engaged and moved to the left (Fig. 7) near the final closing movement of the door. When the door closes, member 72 will move to the left enough to allow rod 71 to drop, whereby latch 42 will be forced into the hole in plate 81 by spring 77 and the upper end of the rod will be withdrawn from notch 79, enabling resetting of the register by crank 20.

It is not necessarily essential that all of the hose be wound up on reel 29. Some of it may be exposed outside the casing of the pump, if desired, as shown in Fig. 8. Here, the nozzle 7 is hung up on the upper section of wall 11, as indicated, a notch 87 being provided in the lower edge of the upper section of wall 11 to receive the hose 6 when door 27 is closed.

To prevent chafing of the hose 6, the vertical side edges of door 27 may be rounded as indicated at 88 in Figs. 3 and 5.

In operation, the finger piece 84 is manually lifted to disengage latch 82 from plate 81 and release the door. While finger piece 84 is held raised, door 27 is drawn out. This, as will be clear from Fig. 7, will allow rod 60 to be moved outwardly by its spring 63, thereby closing the motor switch and starting the pump in operation. Also, the part 72 of rod 60 will move in under the lower end of rod 71, thus maintaining latch 42 in its lifted position and also holding the upper end of rod 71 engaged in the notch 79 in disk 80, thus preventing actuation of the register-resetting mechanism during a dispensing operation. As the door 27 is drawn out the valve 56 is automatically opened. With this valve opened and the pump in operation, the operator lifts nozzle 7 from its seat and walks toward the car to be served, unwinding so much of the hose 6 as he needs. The tank of the car is filled in the usual way—the operator controlling the flow by means of the valve in nozzle 7. When the tank is sufficiently filled, the operator relaxes his pull on the hose, whereupon the hose will be wound up on reel 29. The operator then places the nozzle in position and closes door 27. As the door nears its closed position, the motor switch is opened and valve 56 is closed. Finally, when the door is fully closed, the part 72 of rod 60 releases rod 71, allowing it to drop between the parts 70 and 72 on rod 60, whereby to unlock shaft 21 and enable resetting of the register and to move bolt 82 into position to lock door 27. Incidentally member 72 prevents the motor switch from being actuated until the rod 71 is again lifted and the door 27 opened.

The invention thus provides a hose storage means that is normally completely housed within the pump casing and that can readily be projected outside the housing for convenience in servicing. The invention also provides for the interlocking of the motor switch, the dispensing conduit valve and the register-resetting means with the carriage of the hose storage means to insure proper coordinated operation and prevent improper operations.

I claim:

1. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements, a door in said casing, a carriage connected to the door and mounted to move laterally into and out of the casing when the door is respectively closed and opened, means on said carriage for carrying said hose, means for resetting said register, and means preventing actuation of said resetting means while said door is open.

2. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements, a door in said casing, a carriage connected to the door and mounted to move laterally into and out of the casing when the door is respectively closed and opened, means on said carriage for carrying said hose, means for resetting said register, a manually releasable latch for holding said door in closed position, and means operable by the release of said latch to lock said resetting means against actuation.

3. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements, a door in said casing, a carriage connected to the door and mounted to move laterally into and out of the casing when the door is respectively closed and opened, means on said carriage for carrying said hose, means for resetting said register, a manually releasable latch to hold said door closed, means operable by the manual release of said latch to lock said resetting means against actuation, and means operable by the opening of said door after said latch has been released to hold said locking means in locking position until the door is closed.

4. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements and having an opening, a carriage mounted to slide into and out of said casing through said opening, hose storage means on the carriage, and means for starting and stopping said liquid-forcing means respectively operable by the movement of said carriage out of and into said casing.

5. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements and having an opening, a carriage mounted to slide into and out of said casing through said opening, hose storage means on said carriage, a valve in said conduit, and means for opening and closing said valve respectively operable by the movement of said carriage out of and into said casing.

6. In a liquid dispensing apparatus having a dispensing conduit including a flexible hose, means for forcing liquid through said conduit, a meter interposed in said conduit to measure the liquid dispensed, a register driven by the meter to indicate the measured quantities dispensed, and a casing for housing the aforesaid elements and having an opening, a carriage mounted to slide into and out of said casing through said opening, hose storage means on the carriage, means for resetting the register, and means for preventing actuation of said resetting means while said carriage is moved out of said casing.

JOSEPH A. LOGAN.